(12) United States Patent
Minkin et al.

(10) Patent No.: US 7,884,831 B2
(45) Date of Patent: Feb. 8, 2011

(54) RECONFIGURABLE HIGH-PERFORMANCE TEXTURE PIPELINE WITH ADVANCED FILTERING

(75) Inventors: Alexander L. Minkin, Los Altos, CA (US); Joel J. McCormack, Boulder, CO (US); Paul S. Heckbert, Pittsburgh, PA (US); Michael J. M. Toksvig, Palo Alto, CA (US); Luke Y. Chang, San Mateo, CA (US); Karim Abdalla, Menlo Park, CA (US); Bo Hong, Fremont, CA (US); John W. Berendsen, Beaconsfield (CA); Walter Donavan, Saratoga, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/689,939

(22) Filed: Jan. 19, 2010

(65) Prior Publication Data

US 2010/0118043 A1 May 13, 2010

Related U.S. Application Data

(63) Continuation of application No. 11/556,674, filed on Nov. 3, 2006, now Pat. No. 7,649,538.

(51) Int. Cl.
*G06T 17/00* (2006.01)
*G06T 11/40* (2006.01)
*G09G 5/00* (2006.01)
*G09G 5/02* (2006.01)
*G06K 9/40* (2006.01)
*G06K 9/32* (2006.01)
*G06K 9/64* (2006.01)

(52) U.S. Cl. ............... 345/582; 345/428; 345/587; 345/606; 345/552; 382/254; 382/260; 382/300; 382/303; 711/100; 711/113; 711/123; 711/127

(58) Field of Classification Search ............... None
See application file for complete search history.

(56) References Cited

U.S. PATENT DOCUMENTS

| | | | |
|---|---|---|---|
| 6,005,582 A | 12/1999 | Gabriel et al. | |
| 6,104,415 A * | 8/2000 | Gossett | 345/552 |
| 6,259,460 B1 * | 7/2001 | Gossett et al. | 345/552 |
| 6,664,971 B1 | 12/2003 | Mukherjee et al. | |
| 6,756,989 B1 | 6/2004 | Morgan et al. | |

(Continued)

OTHER PUBLICATIONS

U.S. Appl. No. 11/960,645, filed Dec. 19, 2007.

*Primary Examiner*—Sajous Wesner
(74) *Attorney, Agent, or Firm*—Townsend and Townsend and Crew LLP

(57) ABSTRACT

Circuits, methods, and apparatus that provide texture caches and related circuits that store and retrieve texels in a fast and efficient manner. One such texture circuit provides an increased number of bilerps for each pixel in a group of pixels, particularly when trilinear or aniso filtering is needed. For trilinear filtering, texels in a first and second level of detail are retrieved for a number of pixels during a clock cycle. When aniso filtering is performed, multiple bilerps can be retrieved for each of a number of pixels during one clock cycle.

20 Claims, 13 Drawing Sheets

U.S. PATENT DOCUMENTS

| | | |
|---|---|---|
| 6,778,181 B1 | 8/2004 | Kilgariff et al. |
| 6,897,871 B1 | 5/2005 | Morein et al. |
| 6,924,811 B1 | 8/2005 | Minkin |
| 6,947,054 B2 | 9/2005 | Spangler |
| 7,027,063 B1 | 4/2006 | Minkin |
| 7,167,183 B1 | 1/2007 | Donovan et al. |
| 7,525,551 B1 | 4/2009 | Newhall et al. |
| 7,649,538 B1 * | 1/2010 | Minkin et al. ............... 345/582 |
| 2002/0126133 A1 | 9/2002 | Ewins |
| 2004/0119720 A1 | 6/2004 | Spangler |
| 2004/0257376 A1 | 12/2004 | Liao et al. |
| 2007/0229530 A1 | 10/2007 | Marshall et al. |
| 2008/0211827 A1 | 9/2008 | Donovan et al. |

* cited by examiner

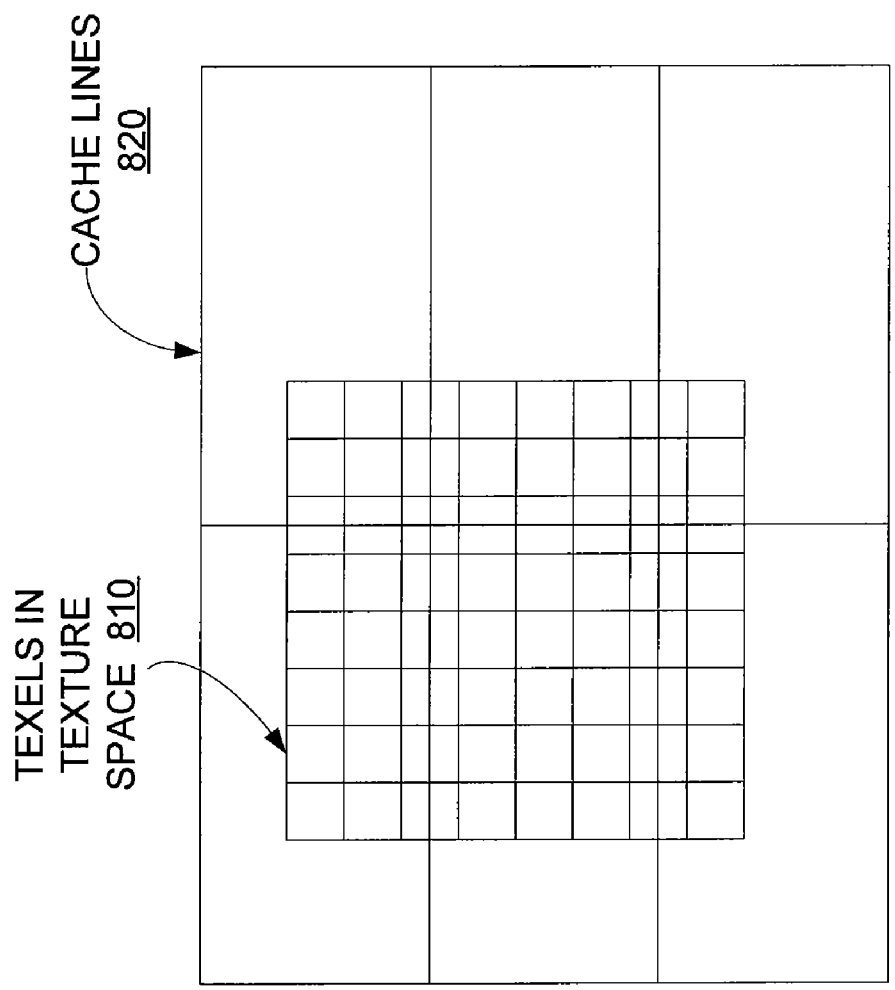

Figure 8B

RECONFIGURABLE HIGH-PERFORMANCE TEXTURE PIPELINE WITH ADVANCED FILTERING

CROSS-REFERENCES TO RELATED APPLICATIONS

This application claims the benefit of U.S. patent application Ser. No. 11/556,674, filed Nov. 3, 2006, now U.S. Pat. No. 7,649,538, and is related to U.S. patent application Ser. No. 11/960,645, filed Dec. 19, 2007, both of which are incorporated by reference.

BACKGROUND

The present invention relates generally to texture pipelines, and more specifically to reconfigurable, high-performance texture pipelines capable of advanced filtering.

The complexity and realism of graphics images has increased tremendously during the past few years, yet the demand for further increases shows no signs of abating. Accordingly, the amount of data that needs to be processed to generate graphics images for games, commercial applications, and other uses will continue to grow for the foreseeable future.

Textures are one type of data that is processed by graphics processors in increasing numbers. Textures provide surface patterns and colors for objects in graphics images. These textures are made up of individual units referred to as texels. Typically, one or more groups of texels in one or more texture levels map into each pixel that is displayed. Each group of texels is filtered by a texture filter, then used in generating the color values and transparency for the corresponding pixel.

There are several types of filtering that may be used. Commonly, one pixel maps into a set of four texels arranged in a two by two array. Such an array of texels is referred to as a texel quad or bilerp. The filtering or averaging of these four texels is referred to as bilinear filtering.

Often, different sizes of a texture, referred to as different levels of detail, or LODs, are used. Larger textures are used for objects that appear to be closer to a viewer; the smaller textures are for more distant objects. On occasion, a location between two LODs maps into a pixel. In such a case, two bilerps, one from each LOD, are filtered in a process referred to as trilinear filtering.

Also, a region of texels that includes more than one bilerp in one texture level may map into a pixel. The processing of these bilerps is referred to as aniso filtering. For example, if two bilerps map into a pixel, 2:1 aniso filtering is needed. On occasion, 4:1, 6:1, 8:1, and other aniso ratios may be used.

Texels are stored in a cache memory and retrieved as needed. When trilinear or higher orders of aniso filtering are needed, greater numbers of bilerps need to be retrieved from the cache memory. If the cache memory is inefficient in delivering these bilerps, image processing is slowed or degraded. Thus, what is needed are circuits, methods, and apparatus that efficiently store and retrieve texels for these different types of filtering.

SUMMARY

Accordingly, embodiments of the present invention provide circuits, methods, and apparatus that provide texture caches and related circuits that store and retrieve texels in an efficient manner.

One exemplary embodiment of the present invention provides a texture cache that outputs an increased number of bilerps each clock cycle. The texture pipeline can be reconfigured to retrieve and process different numbers of bilerps for different numbers of pixels each clock cycle based on the size of the texels and the type of filtering to be performed. In each clock cycle, all needed bilerps may be retrieved for each pixel in a pixel quad, all needed bilerps may be retrieved for less than all of the pixels in a pixel quad, less than all needed bilerps may be retrieved for all pixels in a pixel quad, or less than all needed bilerps may be retrieved for less than all pixels in a pixel quad.

In a specific embodiment of the present invention, for texels up to a certain size, eight bilerps, 32 texels total, are provided each clock cycle. For texels up to this certain size, during each clock cycle, the cache may provide one bilerp for each pixel in a pixel quad for bilinear filtering, two bilerps for each pixel in a pixel quad for trilinear or 2:1 aniso filtering, or four bilerps for two pixels in a pixel quad for higher ratio aniso filtering. When texels are larger than this certain size, fewer bilerps are retrieved each clock cycle, bilerps are retrieved for fewer pixels, or both.

In another exemplary embodiment of the present invention, one cache line can be read from each set in a texture cache in a clock cycle. If a pixel quad requires texels from two or more cache lines in the same set, two or more clock cycles are needed. Accordingly, bilerps are retrieved from a texture cache in a manner that reduces these conflicts. For example, in a specific embodiment of the present invention, four bilerps are retrieved for each of two pixels in a pixel quad each clock cycle when aniso filtering with 4:1 or 8:1 is needed. This reduces conflicts as compared to retrieving two bilerps for each of the four pixels each clock cycle.

In another exemplary embodiment of the present invention, a texture cache is arranged in a number of banks. Each bank has one read and one write port, though in other embodiments, other numbers of read and write ports can be used. Data is stored in cache lines, where each cache line is spread among the banks. Different cache lines can be addressed for each bank in the cache memory, that is, each bank is independently addressable. If data is needed from two or more locations in one bank, the read accesses are serialized and executed in two or more clock cycles.

Various embodiments of the present invention may incorporate these and the other features described herein. A better understanding of the nature and advantages of the present invention may be gained by reference to the following detailed description and the accompanying drawings.

BRIEF DESCRIPTION OF THE DRAWINGS

FIG. 8A illustrates cache line coverage of a texture space according to an embodiment of the present invention, while FIG. 8B illustrates the arrangement of sets in a cache memory according to an embodiment of the present invention;

DESCRIPTION OF EXEMPLARY EMBODIMENTS

Figure 1:
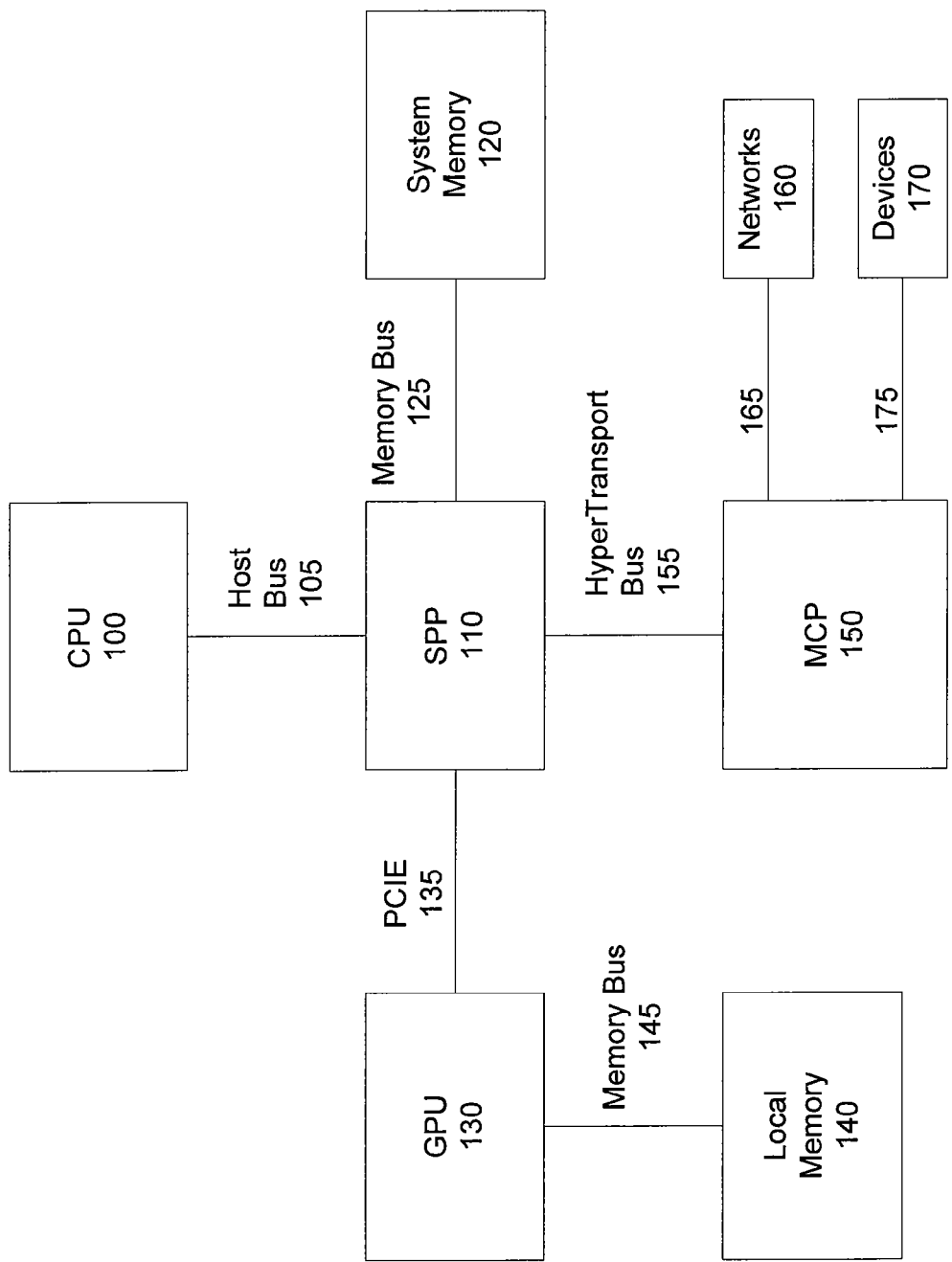
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, local memory 140, media communications processor (MCP) 150, networks 160, and internal and peripheral devices 170.

The CPU 100 connects to the SPP 110 over the host bus 105. The SPP 110 is in communication with the graphics processing unit 130 over a PCIE connection 135. The SPP 110 reads and writes data to and from the system memory 120 over the memory bus 125. The MCP 150 communicates with the SPP 110 via a high-speed connection, such as a HyperTransport bus 155, and connects network 160 and internal and peripheral devices 170 to the remainder of the computer system. The graphics processing unit 130 receives data over the PCIE connection 135 and generates graphic and video images for display over a monitor or other display device (not shown). The graphics processing unit 130 stores fragment and other graphics data in the local memory 140.

The CPU 100 may be a processor, such as those manufactured by Intel Corporation or other supplier, and is well-known by those skilled in the art. The SPP 110 and MCP 150 are commonly referred to as a chipset, and each is typically an integrated circuit. These may alternately be Northbridge and Southbridge devices. The system memory 120 is often a number of dynamic random access memory devices arranged in dual in-line memory modules (DIMMs). The graphics processing unit 130, SPP 110, and MCP 150 are preferably manufactured by NVIDIA Corporation.

The graphics processing unit 130 and local memory 140 may be located on a daughter board or graphics card, while the CPU 100, system platform processor 110, system memory 120, and media communications processor 150 may be located on a computer system motherboard. The graphics card is typically a printed-circuit board with the graphics processing unit 130 and local memory 140 attached. The printed-circuit board typically includes a connector, for example, a PCIE connector attached to the printed-circuit board that fits into a PCIE slot included on the motherboard.

A computer system, such as the illustrated computer system, may include more than one GPU 130. Additionally, each of these graphics processing units may be located on a separate graphics card. Two or more of these graphics cards may be joined together by a jumper or other connection. This technology, the pioneering SLI™, has been developed by NVIDIA Corporation. In other embodiments of the present invention, one or more GPUs may be located on one or more graphics cards, while one or more others are located on the motherboard.

While this embodiment provides a specific type computer system that may be improved by the incorporation of an embodiment of the present invention, other types of electronic or computer systems may also be improved. For example, video and other game systems, navigation, set-top boxes, pachinko machines, and other types of electronic systems may be improved by the incorporation of embodiments of the present invention. While embodiments of the present invention are well suited to graphics processing units, other types of graphics processors, as well as other processors, may benefit from the incorporation of an embodiment of the present invention. For example, multi or general-purpose processors, or other processors, such as integrated graphics processors or general-purpose graphics processing units, may benefit from the incorporation of an embodiment of the present invention.

Also, while these types of computer systems, and the other electronic systems described herein, are presently commonplace, other types of computer and electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Again, textures provide surface patterns and colors for objects located in a graphics image. These textures can be referred to as a texture space, and are formed from individual texels. Textures are applied to structures by mapping individual pixels into a texture space. Typically a pixel maps into four or more texels, which are filtered and applied to the pixel. Examples of types of filtering are shown below.

Figure 2A:
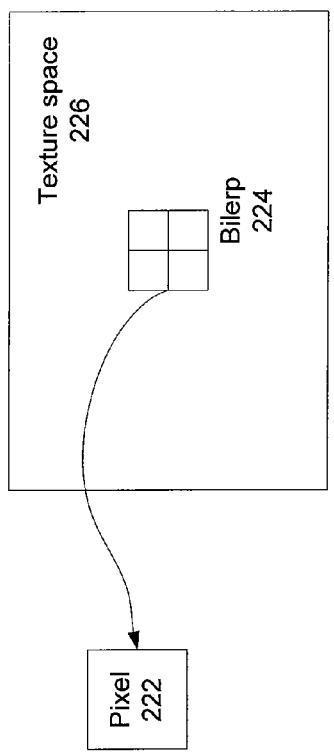
FIGS. 2A-D illustrate types of filtering that are performed in an efficient manner by an embodiment of the present invention.
Figure 2B:
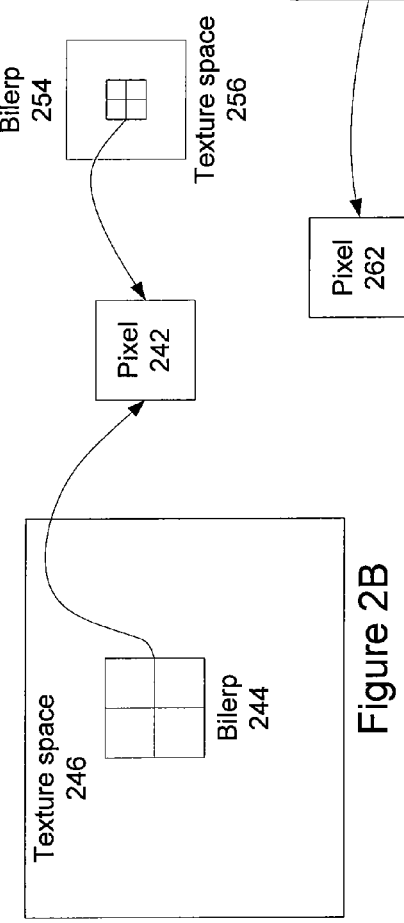
Figure 2C:
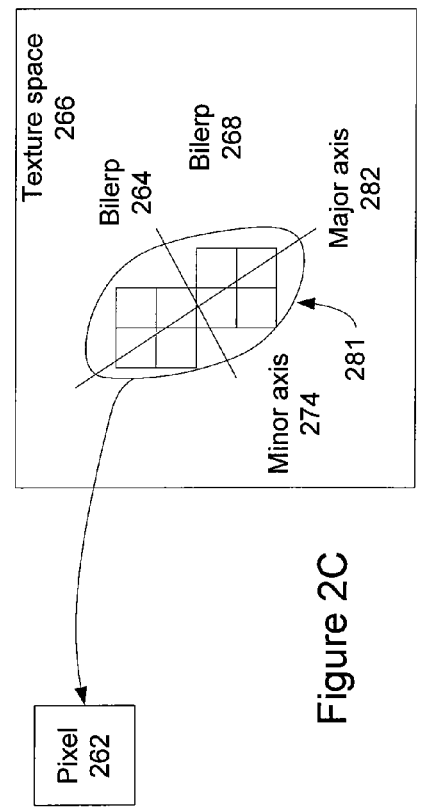

FIGS. 2A-C illustrate types of filtering that are performed in an efficient manner by an embodiment of the present invention. FIG. 2A illustrates an example of bilinear filtering that may be performed in an efficient manner by an embodiment of the present invention. In bilinear filtering, four texels, referred to as one bilerp, are averaged and used to provide texture for a pixel. In this specific example, bilerp 224, located in a texture 226, maps into pixel 222. The four texels that form the bilerp 224 are used to determine the color of pixel 222. Specifically, during filtering these four texels are averaged and used to provide texture information for the pixel 222.

Mipmapping is used to give depth perspective to a graphics image. In mipmapping, textures are replicated in various sizes and stored in memory. Each size is referred to as a level of detail or LOD, or alternately as a miplevel. The smaller versions of these textures may be used to provide texture for distant objects, while larger versions may be used to provide texture objects that appear to be closer. At times, a level between two LODs is desirable. When this occurs, the trilinear filtering is used.

FIG. 2B illustrates an example of trilinear filtering that may be performed in an efficient manner by an embodiment of the present invention. This figure illustrates a pixel 242 receiving texture from bilerps at two different LODs. In this example, pixel 242 receives texture from a bilerp 244 in miplevel 246 and bilerp 254 in miplevel 256. These texels can be retrieved from a texture cache and filtered to provide texture for pixel 242.

Embodiments of the present invention also support aniso filtering, where one pixel receives texture from two or more bilerps in one miplevel. This can happen when a texture is applied to a nonlinear surface, such as a sphere. As a simple example, if a texture is applied directly to a sphere from a viewer's perspective, the texture near the middle band of the sphere will appear normal, while the texture at the top and bottom of the sphere appears spread out. The reverse of this can be seen by considering a flat projection map made of the world. Africa appears normal or correct, while Greenland is greatly exaggerated. In order to provide an even texture around the sphere, multiple bilerps can provide texture for each pixel near the sphere top and bottom. Near the middle band or equator, fewer bilerps are needed, more are needed near the top and bottom, the poles. The number of bilerps needed is referred to as the aniso ratio. For example, in 2:1 aniso filtering, two bilerps are used for each pixel. Other types of aniso filtering, that is, aniso ratios, such as 4:1, 6:1, 8:1, and others are also supported by embodiments of the present invention.

FIG. 2C is an example of 2:1 aniso filtering that may be performed in an efficient manner by an embodiment of the present invention. In this example, pixel 262 corresponds to an ellipse 281 in texture space 266. The ellipse 281 has a minor axis 274 and a major axis 282. The ratio of the major axis to the minor axis is the aniso ratio. In this example, pixel 262 is textured using bilerps 264 and 268 in texture space 266, thus 2:1 aniso filtering is used to determine the texture for pixel 262.

Figure 2D:
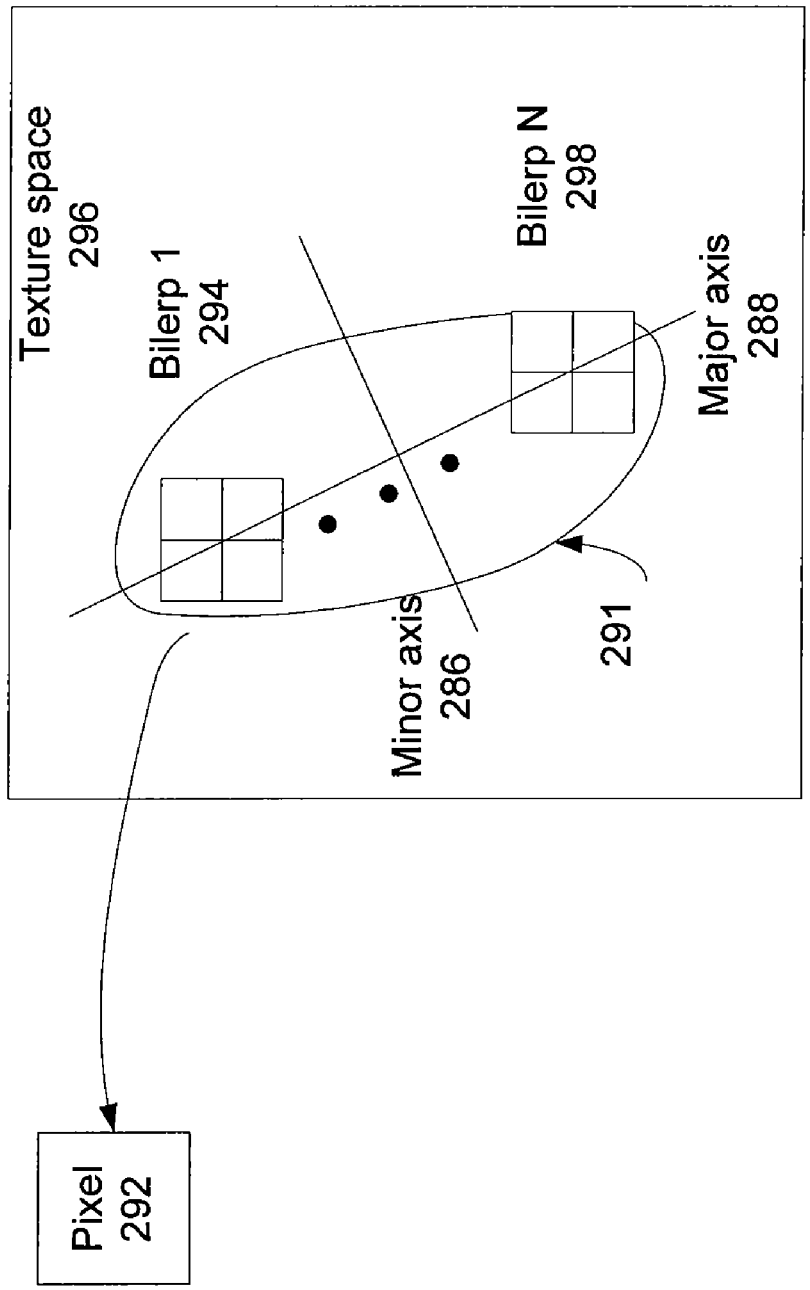

Other aniso ratios are possible and are supported by embodiments of the present invention. FIG. 2D is a general example of N:1 aniso filtering that may be performed in an efficient manner by an embodiment of the present invention. In this example, pixel 292 corresponds to an ellipse or region 291 in texture space 296. The ellipse 291 has a minor axis 286 and a major axis 288. Again, the ratio of the major axis to the minor axis is the aniso ratio. In this example, pixel 292 is textured using N bilerps 294 through 288 in texture space 296, thus N:1 aniso filtering is used to determine the texture for pixel 292.

A graphics image often includes pixels requiring each of these types of filtering. For example, 50% of the pixels in a graphics image may require bilinear filtering, 20% may require trilinear filtering, while the other 30% may require some level of aniso filtering. As can be seen from the above examples, trilinear and aniso filtering require more texels to be filtered for each pixel than bilinear filtering. As a result, when the number of pixels requiring trilinear and the ratio of aniso filtering increase, image processing slows. Accordingly, embodiments of the present invention provide a greater number of texels each clock cycle.

Conventional devices provide for the retrieval and filtering of one bilerp for each pixel in a pixel quad per clock cycle, that is, four bilerps per clock. However, as can be seen above, trilinear filtering and 2:1 aniso filtering requires two bilerps for each pixel, and higher ratio filtering requires even more. Accordingly, a specific embodiment of the present invention provides texture pipelines that can retrieve and filter up to eight bilerps per clock cycle. In this embodiment, up to four pixels can be received each clock cycle. The eight bilerps are allocated among the four pixels in a variety of ways that are optimized for efficient texel retrieval from cache. For example, two bilerps can be retrieved for each pixel in a pixel quad in one clock cycle or four bilerps can be retrieved for two pixels in a pixel quad. In some embodiments of the present invention, if the texels to be retrieved are comparatively large, then fewer bilerps are retrieved for each pixel, bilerps are retrieved for fewer pixels, or both. Other configurations can be supported by embodiments of the present invention as well.

Embodiments of the present invention store and retrieve data using a texture cache located in a texture pipeline. But not all texel data that may be needed can be stored in a texture cache, to do so is not currently cost effective since the texture cache would be prohibitively large. Thus, other levels of memory, such as a second level or L2 cache and a graphics or system memory, may be used to store texture data. Accordingly, when receiving a request for a texel, the cache first determines whether it is currently stored in the texture cache, or whether it needs to be retrieved from another memory. In an exemplary embodiment of the present invention, a first number of pipelines access a second number of L2 cache memories via a crossbar circuit. Each L2 cache memory can further access system or graphics memory via a frame buffer interface. An example is shown in the following figure.

Figure 3:
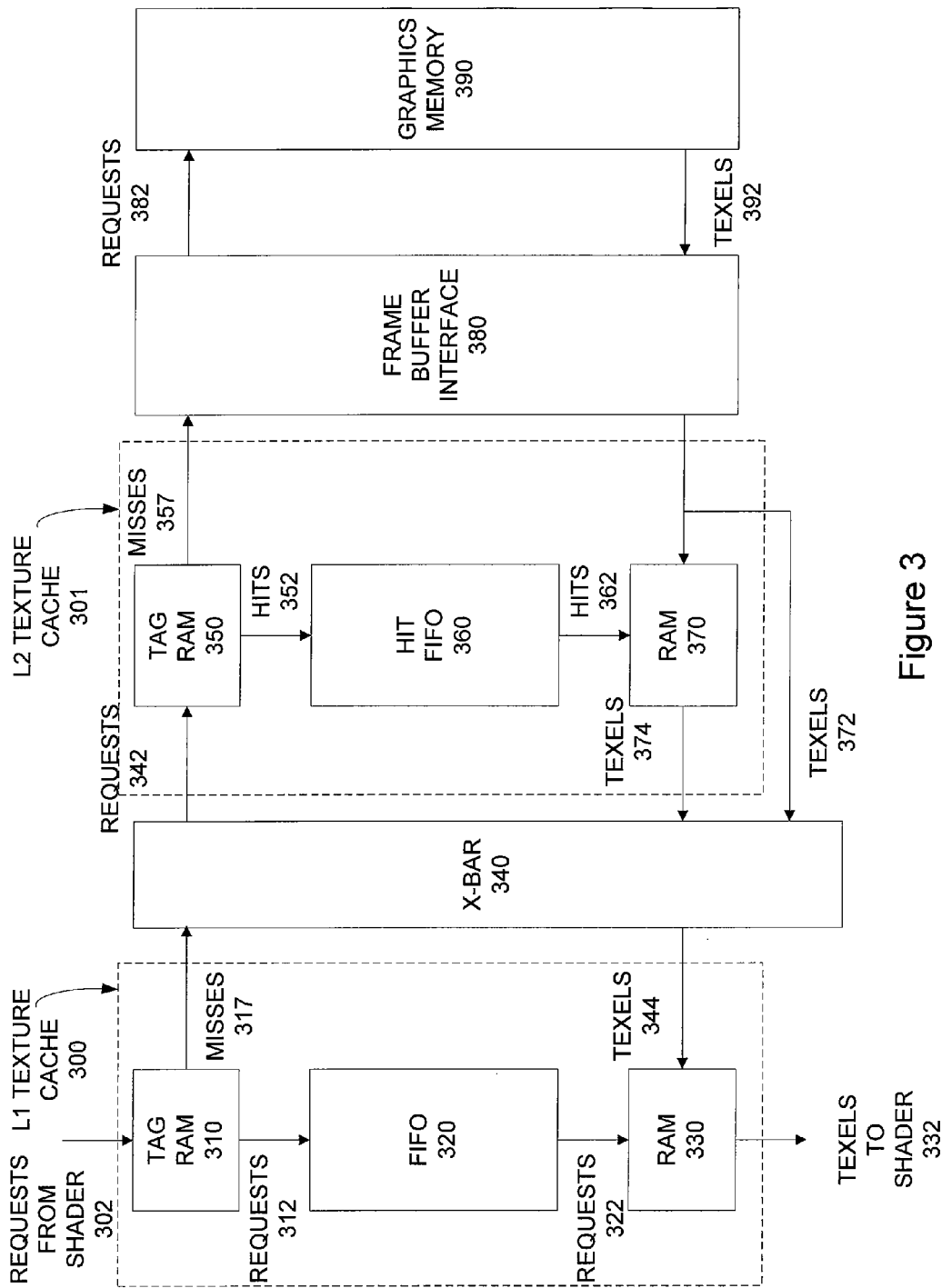
FIG. 3 is a block diagram of a texture pipeline cache communicating with an L2 cache in a partition via a crossbar according to an embodiment of the present invention.

FIG. 3 is a block diagram of a texture pipeline communicating with an L2 cache in a partition via a crossbar according to an embodiment of the present invention. This figure includes level-one texture cache 300 that includes a tag RAM 310, FIFO or other buffer 320, and RAM 330, a crossbar 340, and a partition including a level-two cache 301 that includes tag RAM 350, hit FIFO 360, and RAM 370, as well as a frame buffer interface 380 that communicates with a graphics memory 390. Typically, several texture caches communicate with several partitions via the crossbar 340, though only one texture cache and one partition are shown for simplicity.

Requests for texels are received from the shader on line 302 by the tag RAM 310. The tag RAM 310 determines whether the needed texels are stored in the texture cache or need to be retrieved from the partitions. If the needed texels are not stored in the texture cache, the tag RAM 310 provides the request on line 317 to the crossbar 340. The tag RAM 310 provides each request, hit or miss, on line 312 to the FIFO 320.

The FIFO 320 queues the requests, giving the partitions time to provide missing texels on line 344 to the RAM 330. As requests emerge from the FIFO 320 on line 322, the appropriate texels are read from the RAM 330 and provided to the shader on line 322.

Requests for missing texels are provided by the crossbar 340 to the appropriate partition on line 342. The tag RAM 350 receives the requests on line 342 and determines whether the needed texels are available in the L2 cache. If the texels are not available in the L2 cache, the tag RAM 350 requests the data from the frame buffer interface 380. If the data is available in the second level cache, the tag RAM 350 provides the request to a hit FIFO 360 on line 352.

Frame buffer interface 380 provides requests on line 382 to the graphics memory or DRAM 390, which provides texels back to frame buffer interface 380 on line 392. The frame buffer interface provides these texels to the RAM 370 and directly to the crossbar 340 on line 372. In this way, the crossbar 340 does not need to wait for data to be read from the RAM 370. Requests that are hits emerge from the hit FIFO 360 on line 362, and corresponding texels are read from the RAM 370 and provided on line 374 to the crossbar 340. The crossbar 340 then provides the texels to the appropriate texture cache on line 344.

Again, a larger number of texels is needed for each pixel for trilinear or aniso filtering. Accordingly, embodiments of the present invention provide a greater number of texels in a highly efficient manner. An example of an efficient pipeline is shown in the next figure.

Figure 4:
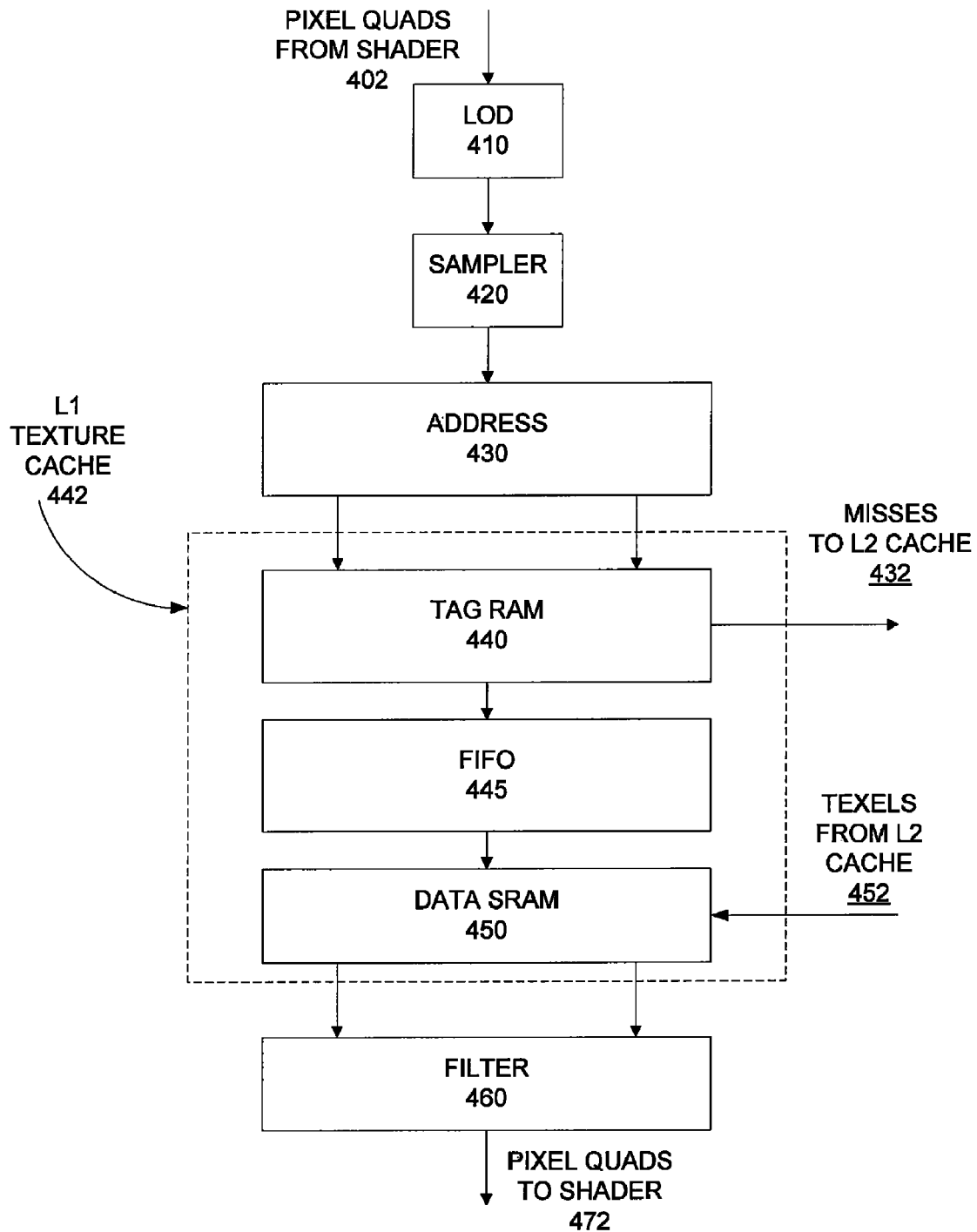
FIG. 4 is a block diagram of a texture pipeline according to an embodiment of the present invention.

FIG. 4 is a block diagram of a texture pipeline according to an embodiment of the present invention. This figure includes a level of detail circuit 410, sampler 420, address circuit 430, a level-one texture cache 442 including tag RAM 440, FIFO 445, and data SRAM 450, as well as a filter 460.

Pixel quads are received from a shader (not shown) on line 402 by a level of detail circuit 410. In a specific embodiment of the present invention, up to one pixel quad is received each clock cycle. The level of detail circuit provides an output to the sampler 420. The sampler includes a scheduler, which determines the texel format and needed type of filtering. The sampler 420, in turn, provides an output to the address block 430. The address block 430 determines the addresses of texels needed by the pixel quads received above and provides them to the tag RAM 440.

The tag RAM 440 checks the addresses of the needed texels and determines whether they are stored in the data SRAM 450, or need to be retrieved from the L2 cache or graphics memory (not shown). If texels need to be retrieved from the L2 cache, a miss signal is provided on line 432 to the L2 cache, which returns texels to the data SRAM 450 on line 452. The tag RAM 440 then provides the addresses FIFO 445, which masks the latency of the return trip from the level-two cache. Outputs from the FIFO 445 are provided to the data SRAM 450. Texels are retrieved from the data SRAM 450 and provided to the filter 460 on line 462. Bilerps are filtered by the filter 460 and provided to the shader on line 472.

In this and the other examples, pixel quads are typically received from a shader. In other embodiments of the present invention, other numbers of pixels may need to be received from a shader.

Again, convention texture pipelines are capable of providing one bilerp for each pixel in a pixel quad in one clock cycle; this data rate is referred to as four bilerps. Texture caches provided by a specific embodiment of the present invention are capable of providing up to two bilerps for each pixel in a pixel quad or four bilerps for each of two pixels in a pixel quad; this data rate is referred to as eight bilerps. Embodiments of the present invention allow for the eight bilerps to be configured in different manners depending on the filtering needed. In situations where texels are comparatively large, fewer than eight bilerps may be provided each clock cycle.

Embodiments of the present invention typically employ an n-way set associative cache. This means that each memory address used for storing texels is assigned to a set, the set including "n" cache lines. Each memory address may be stored in any of these n-cache lines. To simplify cache design, typically only one cache line in a set may be read each clock cycle. It is therefore desirable to include a large number of sets, otherwise not enough cache lines may be read each cycle to provide a desired level of performance. Unfortunately, providing a large number of sets is expensive. Accordingly, a specific embodiment of the present invention utilizes eight sets in its texture cache, though other numbers of sets may be utilized by other embodiments of the present invention.

If texels in two or more cache lines in one set are needed, a set conflict occurs. When a set conflict occurs, requested cache lines in the set are read during different clock cycles. For example, if two cache lines in a set are requested, a first cache line is read during a first clock cycle and a second cache line is read during a second subsequent clock cycle. This can be achieved by serializing the addresses for cache lines in the same set. An example of a tag RAM circuit the can be used for this purpose is shown in the following figure.

Figure 5:
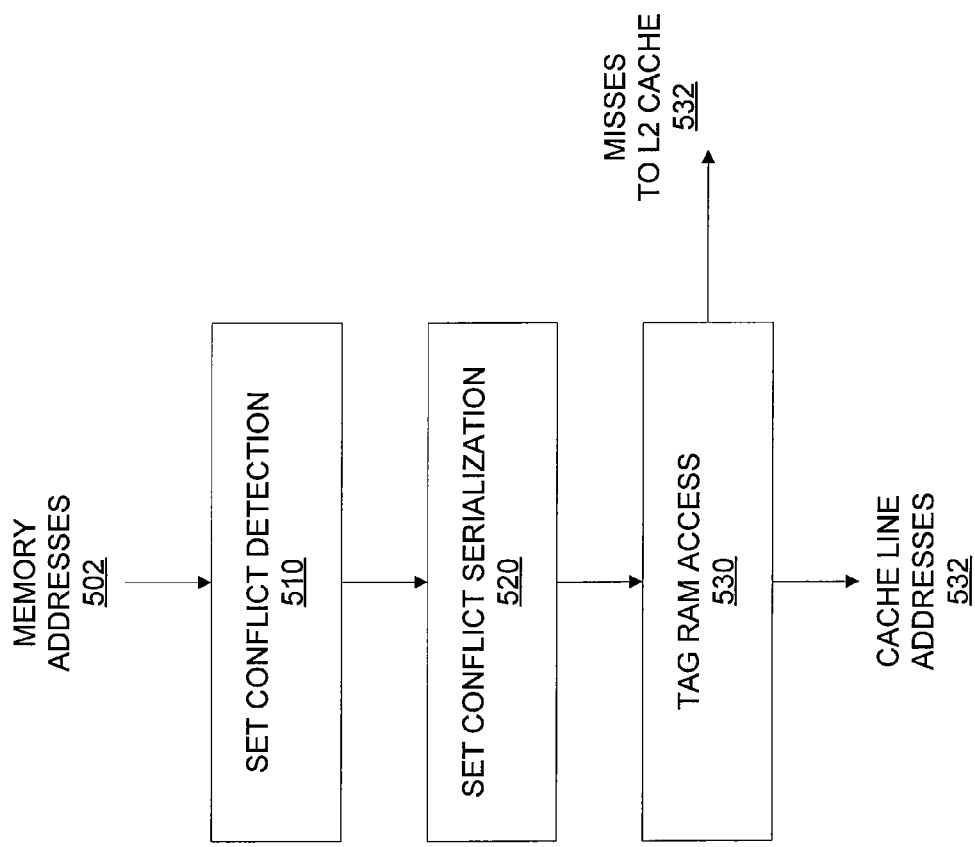
FIG. 5 is a block diagram of a tag RAM according to an embodiment of the present invention.

FIG. 5 is a block diagram of a tag RAM that may be used as the tag RAM 440 in FIG. 4. This tag RAM includes a set conflict detection circuit 510, set conflict serialization circuit 520, and tag RAM access circuit 530. Addresses are received on line 502 from an address block. Set conflict detection circuit 510 determines whether a set conflict exists between two or more of the addresses. That is, the set conflict detection circuit 510 determines whether two or more cache lines in one set need to be addressed.

If there is one or more such conflicts in the addresses, the set conflict serialization circuit 520 serializes the addresses such the cache lines are retrieved during sequential clock cycles. For example, in a specific embodiment of the present invention, a 16-way set associative cache is used; accordingly, up to 16 cache lines in a set may need to be retrieved. Thus, in this embodiment of the present invention, set conflict serialization circuit 520 may serialize as many as 16 addresses for 16 different clock cycles.

A tag RAM access circuit 530 determines whether the needed texels are stored in cache or need to be retrieved from the level-two cache. A miss signal is provided to the level-two cache on line 532. Cache line addresses are provided to a FIFO (not shown) on line 532.

Typical embodiments of the present invention employ a texture cache that is arranged in a number of banks, where each bank is a single-port memory such that data at one address can be read from each bank each clock cycle. Since only one address can be read from each bank each clock cycle, if data at more than one address needs to be read from a bank, a bank conflict occurs. Accordingly, the reads to that bank are serialized and occur on different clock cycles. Specifically, if data at two addresses is needed from one bank, data at a first address is retrieved in a first clock cycle, while data at a second address is retrieved on a second subsequent clock cycle. In a specific embodiment of the present invention, eight bytes of data can be read each clock cycle. Depending on texel size, these eight bytes may include one or more texels. Also, to reduce memory bandwidth usage, texels may be compressed. When texels are compressed, these eight bytes may include several texels. Once read, these texels are decompressed for use by the filters. A block diagram of such a texture cache and associated circuitry is shown in the following figure.

Figure 6:
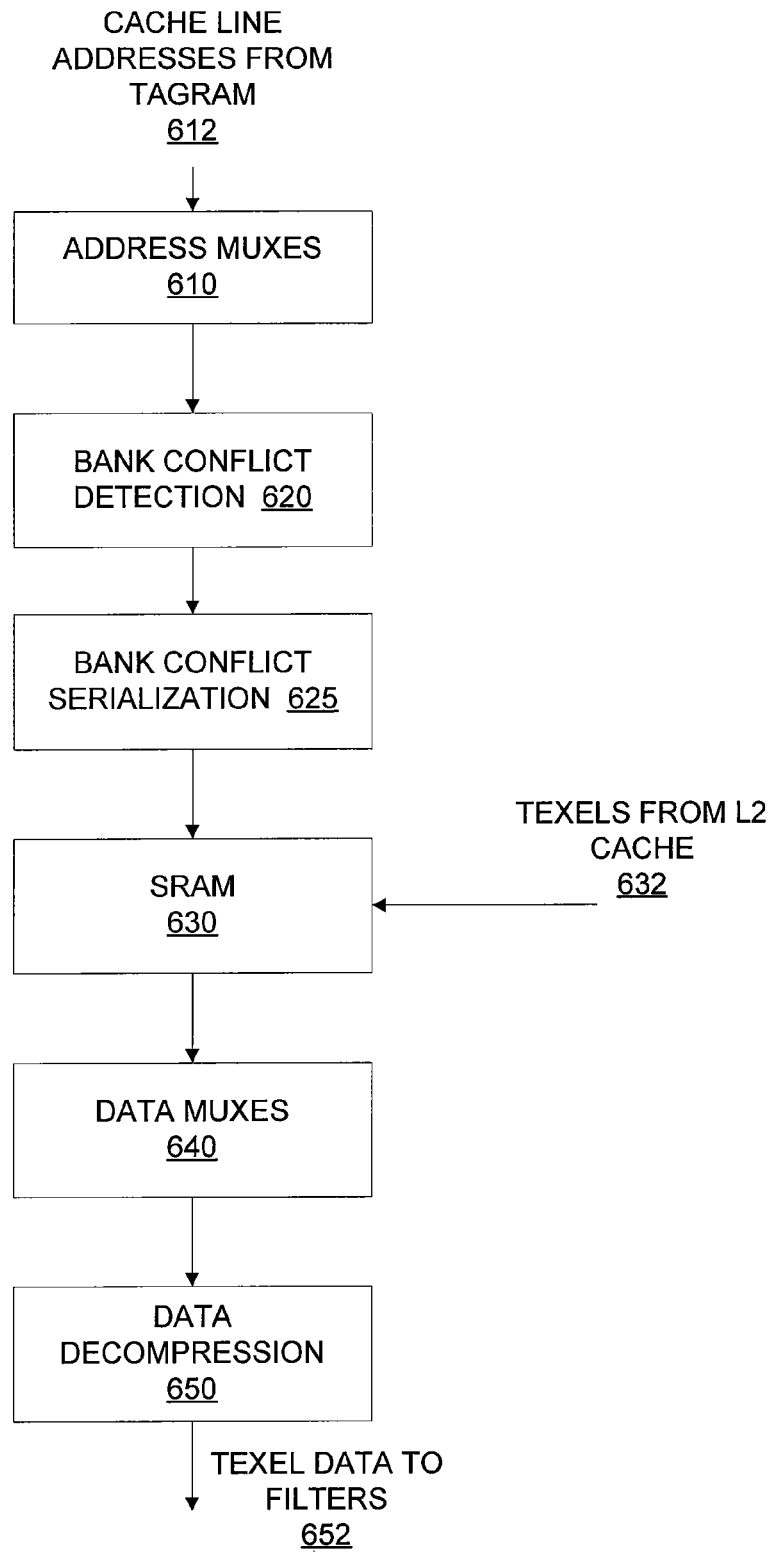
FIG. 6 is a block diagram of a texture cache and related circuitry according to an embodiment of the present invention.

FIG. 6 is a block diagram of a texture cache and related circuitry according to an embodiment of the present invention. This figure includes address multiplexers 610, bank conflict detection circuit 620, bank conflict serialization circuit 625, SRAM 630, data multiplexers 640, and data decompression circuit 650. Addresses are received from the tag RAM on line 612 by the address multiplexers 610. The address multiplexers multiplex addresses from the tag RAM to the individual banks that comprise the SRAM 630. These addresses are received by the bank conflict detection circuit 620, which determines whether any conflicts arise, that is, whether two or more addresses are received for one bank.

If a conflict occurs, the conflicting addresses are serialized by the bank conflict serialization circuit 625. This has a disadvantage that corresponding texels are retrieved in two clock cycles instead of one. Accordingly, texture cache lines provided by embodiments of the present invention are arranged in order to reduce the occurrence of bank conflicts.

Addresses are provided by the bank conflict serialization circuit 625 to the SRAM 630. Texel data retrieved from the level-two cache, which may in turn have come from the graphics memory, is received by the SRAM 630 on line 632. Texel data is retrieved from the SRAM 630 and multiplexed by the data multiplexers 640. The data multiplexers 640 sort data from the various banks of the SRAM 630 into a proper order for use by the texture filters.

Again, in various embodiments of the present invention, texels are stored in the SRAM 630 in a compressed format. If the texels are compressed, they are decompressed by the data decompression circuit 650, and provided to the texture filter on line 652. In one embodiment, a texel may be compressed to 4 bits in size. In this or other embodiments of the present invention, texels may be compressed to other sizes, such as 8 or 16 bits. Also, in a specific embodiment of the present invention, all texels are stored as compressed data in the texture cache, though in other embodiments, some texels may be compressed while others are uncompressed.

Several design choices are available for use in the SRAM 630. For example, a multi-port memory may be used. However, a multi-port memory requires overhead area and design complexity for each additional port. The additional area increases die costs for the circuit, while the additional complexity increases the design costs. Accordingly, in a specific embodiment of the present invention, a multitude of single read and write port memory banks are used.

Figure 7:
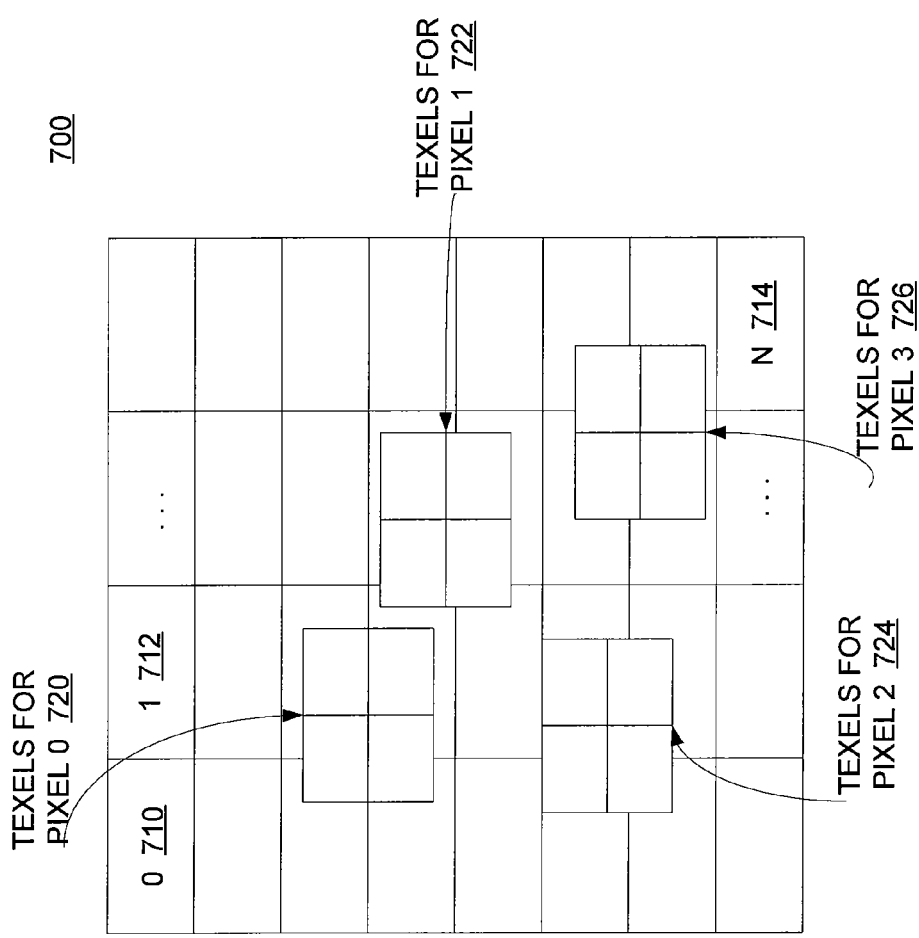
FIG. 7 is a diagram showing a configuration of a cache memory according to an embodiment of the present invention.

FIG. 7 is a diagram showing a configuration of a cache memory according to an embodiment of the present invention. This figure illustrates SRAM 630, which in this example includes "N" banks, specifically banks "0" 710 through "N" 714. Various bilerps 720 through 726 are shown for exemplary purposes. It should be noted that the bilerps are not necessarily drawn to scale.

In a specific embodiment of the present invention, 32 banks are used for a texture cache SRAM. Each bank includes one read port and one write port, each of which are eight bytes in width. Data is written to the banks as cache lines. Each cache line is distributed among 16 of these 32 banks. Specifically, each cache line is placed in one half of the banks, either the upper or lower 16 of the 32 banks. In this embodiment of the present invention, each cache line is written to one of 16 cache lines in a set, that is, a 16-way set associative cache is used, though other numbers of cache lines for each set may be used in other embodiments of the present invention. For example, 4, 8, 16, 20, 24, 30, 32, or other numbers of cache lines may be used for each set. In this specific embodiment, a cache line is 128 bytes in size, though in other embodiments of the present invention, other cache line sizes may be used. This specific embodiment of the present invention uses eight sets for its cache. That is, data at each higher-level memory address can be cached in one of eight sets. More specifically, data at each higher-level memory address can be cached in any one of the 16 cache lines in one of the eight sets.

Several factors can be considered when determining cache line size and the number of cache lines to be used. For example, a smaller size cache line increases the chance that data stored in a line will be needed, and reduces cache line thrashing. However, a small cache line means a greater number of cache lines are needed, which requires more and larger tags in the tag RAM, increasing the cost of that circuitry.

Data is read from the banks. In the specific embodiment, eight bytes of data could be read each clock cycle from each of 32 banks, for a total of 256 bytes. Each bank is uniquely addressable during a read, that is, data from different cache lines can be read from each bank. Again, to support an eight-bilerp data rate, during each clock cycle, up to eight texels, two bilerps, can be read for each pixel in a pixel quad or four bilerps can be read for two pixels in a pixel quad. If the texels are comparatively large, fewer bilerps can be read, bilerps can be read for fewer pixels, or both.

The number of banks in the texture cache is also subject to several design tradeoffs. For example, having more banks reduces the frequency of bank conflicts. However, more banks increase the complexity of routing and related circuits, which increases device costs.

Also, the size of the texture cache itself is subject to tradeoffs. Providing extra cache lines allows cache lines to be allocated or reserved when a miss occurs in the tag RAM, thereby reducing the complexity of circuitry interfacing to higher levels of memory. Examples of this can be found in U.S. Pat. No. 6,629,188, titled "Circuit and Method for Prefetching Data for a Texture Cache," by Minkin et al, which is incorporated by reference. Unfortunately, a larger cache does increase die costs.

Under typical conditions, a quad of pixels maps into an area of texture space that is contained within an eight by eight array of texels. However, the alignment of the cache lines to the 8×8 array of texels is uncertain. Accordingly, six cache lines are needed to ensure that an 8×8 array of texels can be retrieved in one clock cycle. In a specific embodiment, eight cache lines are used.

Figure 8B:
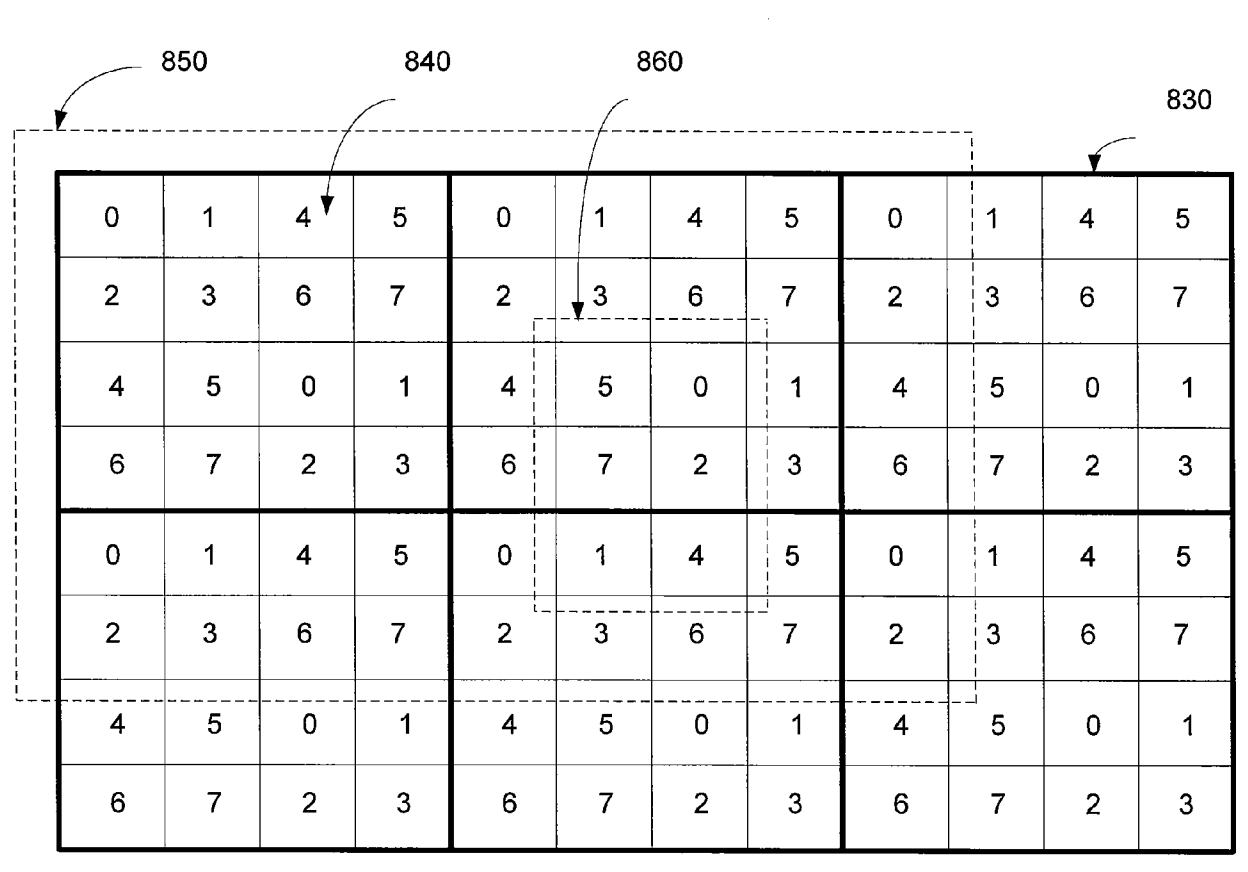

FIG. 8A illustrates cache line coverage of a texture space according to an embodiment of the present invention, while FIG. 8B illustrates the arrangement of sets in a texture cache according to an embodiment of the present invention. FIG. 8A includes an 8×8 array of texels from a texture space 810 and six cache lines 820. In this way, no matter the alignment of the array of texels to the cache lines, the cache lines cover the entire 8×8 array of texels, ensuring that, under normal conditions, all texels needed for a pixel quad are retrieved in one clock cycle.

Again, the texture cache is arranged to avoid set conflicts when texel data is read. The texture cache in one embodiment of the present invention is an n-way set associative cache, though in other embodiments of the present invention, direct mapped or fully associative caches can be used. Data at each memory address is assigned to one set in the cache. That data can be stored in any one cache line in the set of cache lines. In a specific embodiment of the present invention, a texture is stored in cache lines in the manner illustrated in FIG. 8B.

FIG. 8B illustrates an exemplary arrangement of cache lines in a cache memory according to an embodiment of the present invention. In this figure, a number of cache lines 840, in eight sets labeled zero through seven, are arranged in a pattern 830 such that set conflicts are avoided. In this example, each square labeled "0" corresponds to one cache line in set "0." The set allocation pattern is repeated across the whole texture.

Again, in a specific embodiment of the present invention, six adjacent cache lines are needed to ensure that an eight-by-eight array of texels can be read each clock cycle, in the absence of set or bank conflicts. This specific embodiment of the present invention uses the next higher number of cache lines that is a power of two, that is, it uses eight adjacent cache lines. Each one of the eight sets can provide one cache line each clock cycle. Accordingly, textures are distributed across sets such that each adjacent cache line comes from a different set.

As an example, a texture is stored in a subset 850 of the cache lines. An example of six adjacent cache lines 860 cover an eight-by-eight array of texels (not explicitly shown) in this texture. These six adjacent cache lines can be read in one clock cycle without incurring a set conflict. Specifically, cache lines from sets 5, 0, 7, 2, 1, and 4 can be read. Since no more than one cache line is read from any one set, no set conflict occurs. It can be seen that any six adjacent cache lines can be selected in this manner without creating a conflict.

Again, in a specific embodiment of the present invention, eight adjacent cache lines are read each clock cycle. In this example, cache lines in sets 3 and 6 can be read along with cache lines 860 without causing a conflict. It can also be seen that such a two-by-four array of adjacent cache lines can be read at any point in the texture cache without causing a set conflict. Specifically, for any placement of these adjacent cache lines, one cache line from each set zero through seven can be read each clock cycle, thereby avoiding set conflicts.

Again, embodiments of the present invention provide an increased number of bilerps per clock cycle as compared to conventional circuits. The texture cache pipeline is convertible in the manner that it retrieves these bilerps. That is, to avoid set and bank conflicts, different numbers of bilerps can be retrieved for different numbers of pixels. The numbers of bilerps and pixels can also be varied depending on texel size and the type of filtering to be performed. An example of a specific embodiment of the present invention is shown in the table below.

| Texel size (Bits) | Bilinear (Pixel/Bilerp/ Clocks) | Iso-Trilinear (Pixel/Bilerp/ Clocks) | 2:1 Aniso (Pixel/Bilerp/ Clocks) | 4:1 Aniso (Pixel/Bilerp/ Clocks) | 8:1 Aniso (Pixel/Bilerp/ Clocks) |
|---|---|---|---|---|---|
| 4 | 4/1/1 | 4/2/1 | 4/2/1 | 2/4/2 | 2/4/4 |
| 8 | 4/1/1 | 4/2/1 | 4/2/1 | 2/4/2 | 2/4/4 |
| 16 | 4/1/1 | 4/2/1 | 4/2/1 | 2/4/2 | 2/4/4 |
| 32 | 4/1/1 | 4/2/1 | 4/2/1 | 2/4/2 | 2/4/4 |
| 64 | 4/1/1 | 4/1/2 | 4/1/2 | 2/2/4 | 2/4/8 |
| 128 | 2/1/2 | 2/1/4 | 2/1/4 | 2/1/8 | 2/4/16 |

Texel size is listed in the left hand column. These texel sizes may be for compresses or uncompressed texels. For a specific embodiment of the present invention, compressed texels may have a size of 4 or 8 bits, while uncompressed texels may have any of the listed sizes. In other embodiments of the present invention, other sized compressed and other sized uncompressed texels may be used.

The five right columns list the number of pixels for which bilerps are received in a clock cycle, the number of bilerps received for those pixels in the clock cycle, and the number of clock cycles required to retrieve all texels for a pixel quad. These numbers are valid for a situation where there are no set or bank conflicts. If either set or bank conflicts exist, a greater number of clock cycles will be needed to retrieve the required texels. The values and filtering types listed here are for one specific embodiment of the present invention, other embodiments may have other values and employ other types of filtering.

Again, bilinear filtering requires one bilerp for each pixel. If pixels are 64 bits or smaller in size, one bilerp may be provided for each pixel in a pixel quad each clock cycle. For larger, 128 bit pixels, one bilerp can be retrieved for two pixels in the pixel quad each clock cycle. Accordingly, two clock cycles are required to retrieve one bilerp for each of the four pixels.

Both trilinear and 2:1 aniso filtering require two bilerps for each pixel. For texels that are 32 bits or smaller in size, two bilerps can be retrieved for each pixel from texture cache memory each clock cycle. For 64-bit texels, one bilerp is retrieved for each pixel each clock cycle, such that two clock cycles are required to retrieve the texels for all the pixels in the pixel quad. When the texels are larger still, 128 bits in this example, one bilerp is received for each of two pixels in the pixel quad, meaning four clock cycles are required to retrieve all the necessary bilerps.

For 4:1 and higher aniso ratios, for texels sizes 32 bits or smaller, a specific embodiment of the present invention retrieves four bilerps for two pixels in the pixel quad each clock cycle. For larger texels, such as 64-bit texels, the number of bilerps retrieved is reduced to two, while for 128-bit texels, the number of bilerps retrieved for the two pixels is reduced to one.

For higher aniso ratios, such as 4:1 or 8:1 aniso ratios, more bilerps are needed than can be retrieved in a single clock cycle. For example, for 4:1 aniso ratios, four bilerps are needed for each of four pixels in a pixel quad, meaning 16 bilerps are needed each clock cycle. In this specific embodiment of the present invention however, eight bilerps are provided each clock cycle. Accordingly, either two bilerps can be retrieved for each of four pixels in a pixel quad, or four bilerps can be retrieved for two pixels in the pixel quad. As shown in the above table, a specific embodiment of the present invention retrieves four bilerps for two pixels in the pixel quad each clock cycle. The following figure illustrates why this is so.

Figure 9B:
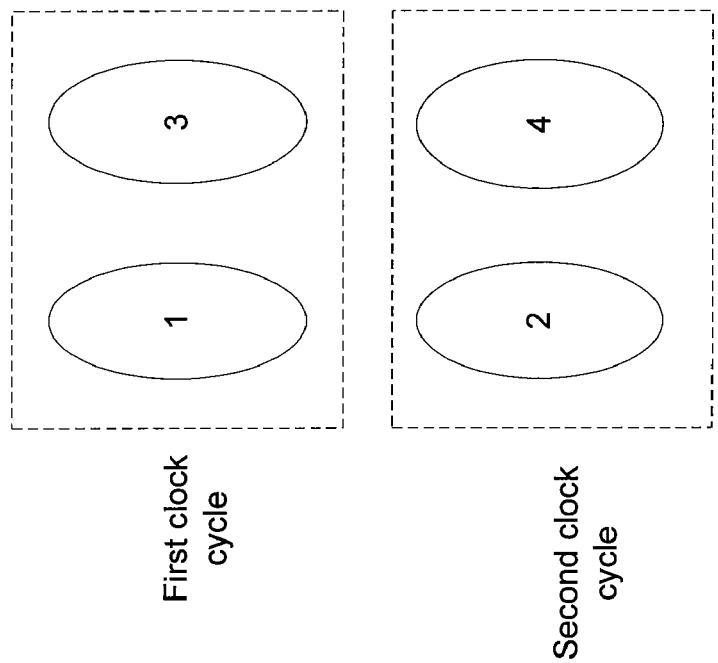
FIGS. 9A and 9B illustrate areas in a texture that provide texels for four pixels in a pixel quad.
Figure 9A:
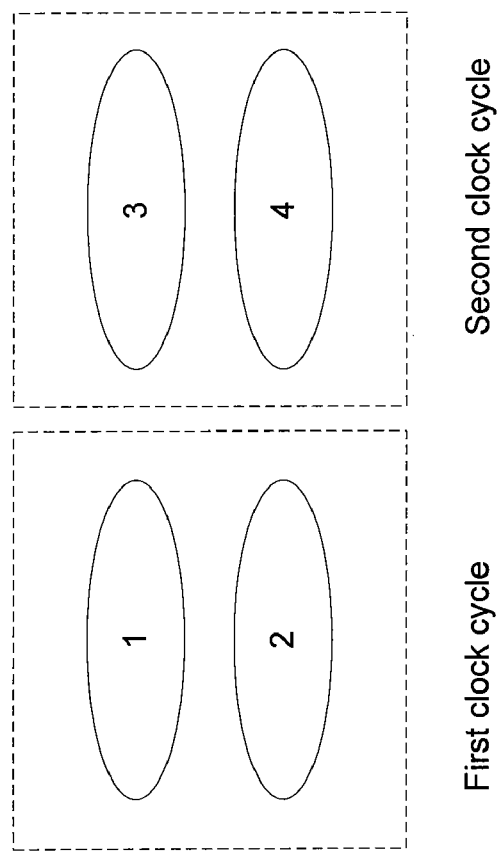

FIG. 9A illustrates areas in a texture that provide texels for four pixels in a pixel quad. Specifically, a first pixel, pixel 1, receives texture information from region 1. Region 1 in this example includes four bilerps. The same is true for regions 2, 3, and 4.

Again, embodiments of the present invention provide texture caches that are arranged such that retrieval of cache lines close in texture space proximity do not result in set or bank conflicts. Accordingly, to avoid set conflicts, during each clock cycle, it is desirable to read bilerps that are near each other. For this reason, bilerps in the left-hand regions 1 and 2 are read during a first clock cycle, while bilerps in right hand regions 3 and 4 are read during a second clock cycle.

In FIG. 9B, texels in four regions are again used to provide texture for four pixels. In this example, each major access has a vertical orientation, as compared to the horizontal orientation of FIG. 9A. Accordingly, texels in the top two regions 1 and 3 are retrieved during a first clock cycle, while those in regions 2 and 4 are retrieved during a second clock cycle. In a specific embodiment of the present invention, when the major axis has an angle between zero and 45°, bilerps are retrieved as shown in FIG. 9A, while when the major axis has an angle between 45 at 90°, bilerps are retrieved as shown in FIG. 9B. This principle can be extended to other aniso ratios. An interesting situation arises for 6:1 aniso ratios, as is shown in the following figure.

Figure 10:
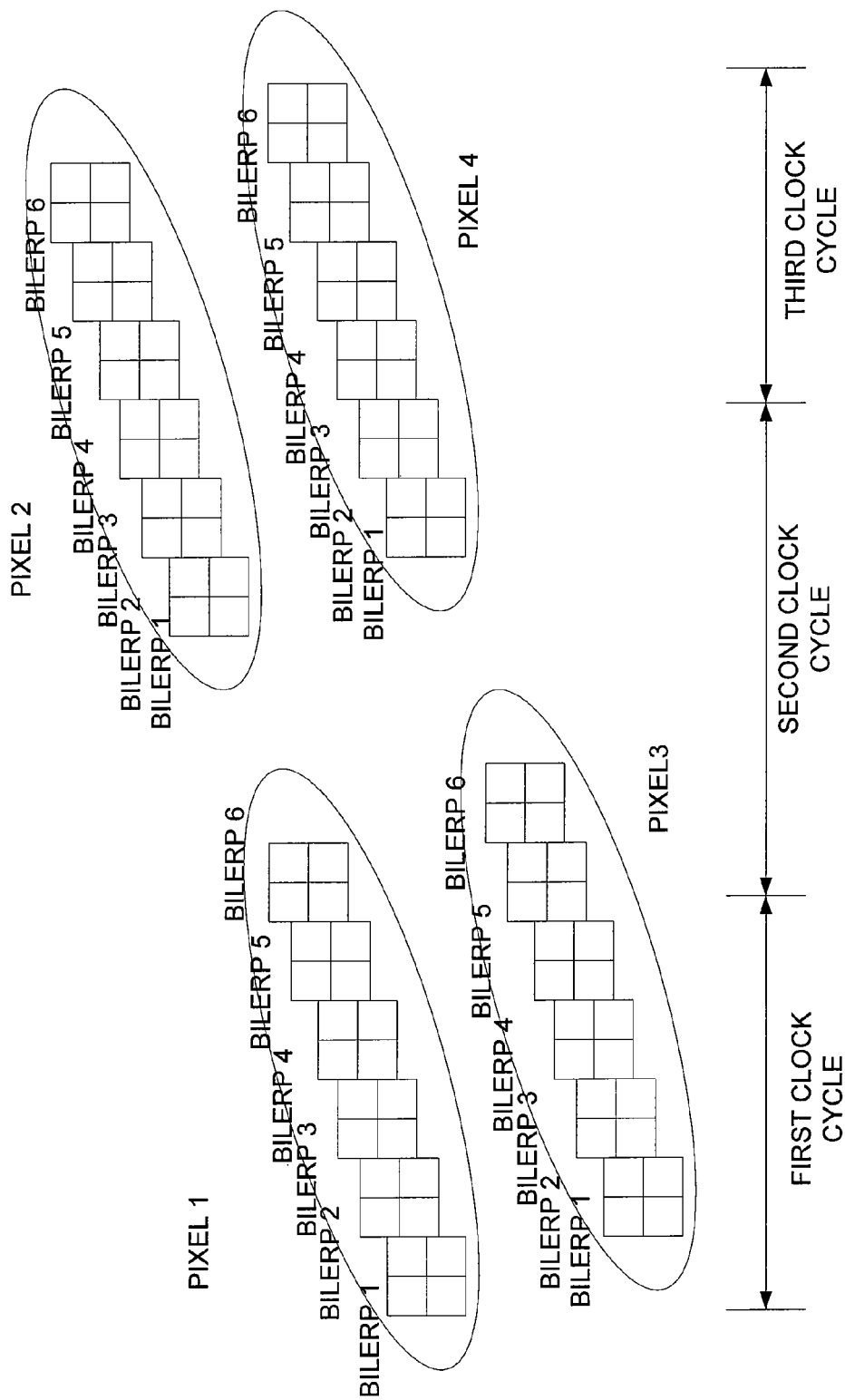
FIG. 10 illustrates a method of retrieving bilerps from a texture cache for 6:1 aniso filtering according to an embodiment of the present invention.

FIG. 10 illustrates a method of retrieving bilerps from a texture cache for 6:1 aniso filtering according to an embodiment of the present invention. In this example, bilerps in four regions correspond to pixels 1, 2, 3 and 4 as shown. Each region includes six bilerps, an aniso ratio of 6:1.

Since there are four pixels, each corresponding to six bilerps, 24 bilerps need to be retrieved for this pixel quad. Since eight bilerps can be retrieved each clock cycle, three clock cycles are needed to retrieve all the bilerps. Again, to avoid set and bank conflicts, bilerps that are close to each other in texture space are retrieved together. Accordingly, bilerps 1 through 4 for pixels 1 and 3 are retrieved on the first clock cycle. Bilerps 5 and 6 for pixels 1 and 3, and bilerps 1 and 2 for pixels 2 and 4 are retrieved during a second clock cycle. Bilerps 3 through 6 for pixels 2 and 4 are retrieved during a third clock cycle.

Again, the particular numbers shown here are for a specific embodiment of the present invention. In other embodiments, other numbers of bilerps may be retrieved each clock cycle, and bilerps may be retrieved for other numbers of pixels. Also, when more bilerps are needed than can be retrieved in one clock cycle, or pixels are large enough that all bilerps cannot be retrieved in one clock cycle, the bilerps that are retrieved, and the number of pixels for which they are retrieved, may be configured in various ways. One exemplary method is shown in the following figure.

Figure 11:
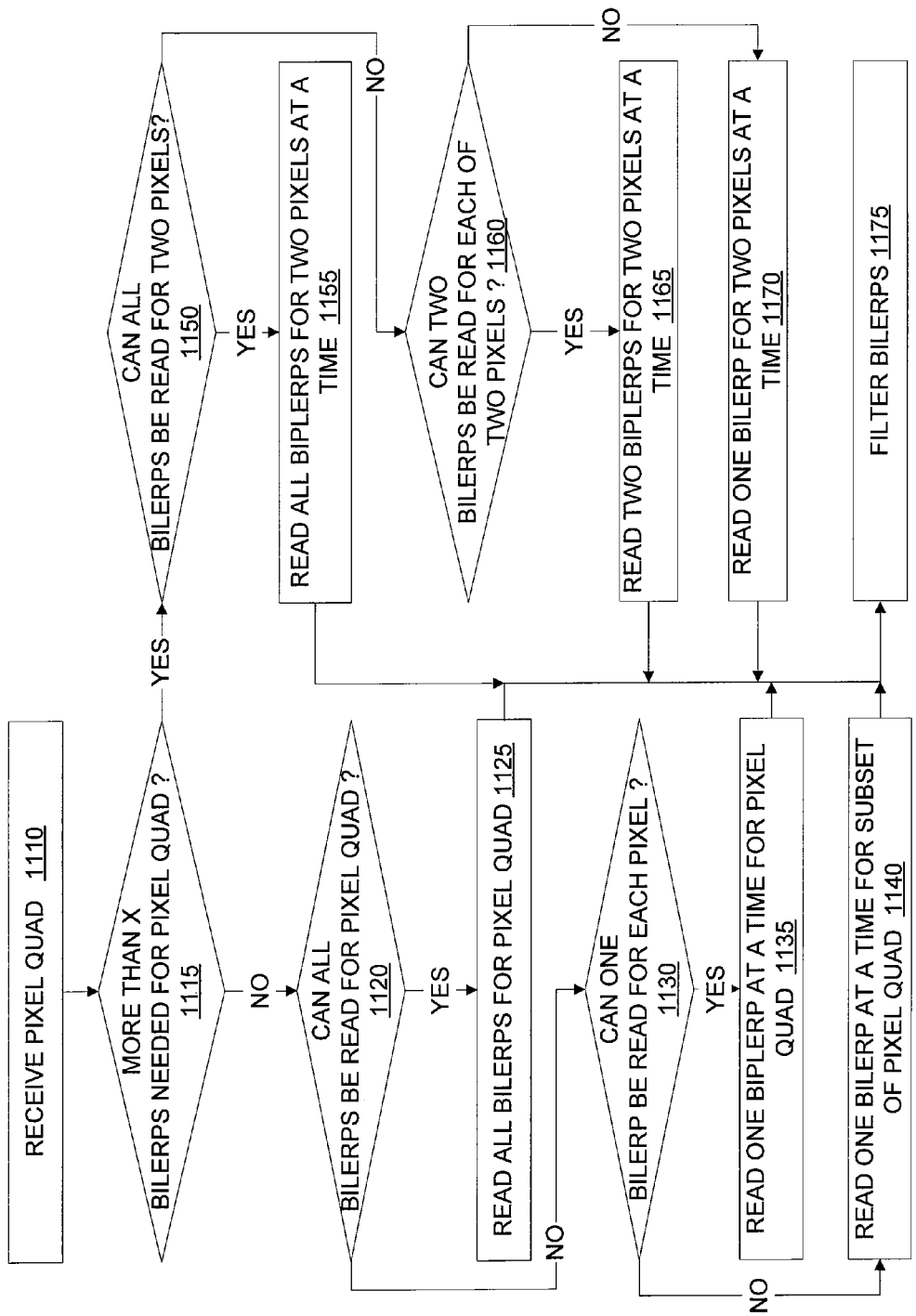
FIG. 11 is a flowchart illustrating a method of retrieving a configurable number of bilerps for a configurable number of pixels according to an embodiment of the present invention.

FIG. 11 is a flowchart illustrating a method of retrieving a configurable number of bilerps for a configurable number of pixels according to an embodiment of the present invention. In this embodiment of the present invention, the number of bilerps retrieved for each pixel, and number of pixels for which bilerps are retrieved, are configurable based on the size of the texels and the filtering to be used. Generally, if texels are large, fewer bilerps are read, and if the texels are larger still, fewer bilerps are read for fewer pixels. Also, for higher aniso ratios, bilerps are read for fewer pixels, thus avoiding conflicts as illustrated in FIGS. 9A and 9B.

Specifically, in act 1110, a pixel quad is received. In act 1115, it is determined whether a certain number of bilerps are needed for the pixel quad. In a specific embodiment of the present invention, it is determined whether more than eight bilerps are needed for the pixel quad. If less than in this number of bilerps is needed, it is determined in act 1120 whether all bilerps needed for the pixel quad can be read. Typically, this is determined by considering the size of the texels. If all the bilerps can be read, they are read in act 1125 and filtered in act 1175. If not, then it is determined whether one bilerp can be read for each pixel in act 1130. If one bilerp can be read for each pixel in the pixel quad, then the bilerps are read one bilerp at a time for each pixel in the pixel quad in act 1135. If not, then one bilerp is read for a subset of the pixel quad in act 1140.

If more than a certain number of bilerps are needed for the pixel quad, for example more than eight bilerps are needed for the pixel quad, then it is determined in act 1150 whether all the bilerps can be read for two pixels in the pixel quad. If yes, then all bilerps are read for two pixels at a time in act 1155, after which the bilerps are filtered in act 1175. If all bilerps cannot be read for two pixels, for example, the texels are comparatively large in size, then it is determined whether some of the bilerps can be read for each pixel in act 1160. If yes, then these bilerps are read for two pixels in act 1165. If not, then one bilerp is read for two pixels at a time in act 1170.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of filtering texels comprising: with a texture pipeline:
   receiving a plurality of pixels;
   generating a request for a plurality of texels;
   determining a type of filtering to be performed on the plurality of texels;
   if 4:1 aniso filtering is to be performed on the plurality of texels, then
   providing addresses for at least four bilerps for at least two pixels in the plurality of pixels;
   receiving the at least four bilerps for the at least two pixels in the plurality of pixels; and
   filtering the at least four bilerps for the at least two pixels in the plurality of pixels,
   wherein the at least four bilerps for the at least two pixels in the plurality of pixels are received in one clock cycle.

2. The method of claim 1 wherein the plurality of pixels comprises four pixels.

3. The method of claim 1 further comprising:
   if trilinear filtering is to be performed on the plurality of texels, then
   providing addresses for a first bilerp for each pixel in the plurality of pixels, the first bilerps in a first level of detail;
   providing addresses for a second bilerp for each pixel in the plurality of pixels, the second bilerps in a second level of detail;
   receiving the first bilerp for each pixel in the plurality of pixels, the first bilerps in a first level of detail;
   receiving the second bilerp for each pixel in the plurality of pixels, the second bilerps in a second level of detail; and
   filtering the first and second bilerps for each pixel in the plurality of pixels,
   wherein the first and second bilerps for each pixel in the plurality of pixels are received in one clock cycle.

4. The method of claim 3 wherein the addresses are provided to a texture cache, and texels are received from the texture cache.

5. The method of claim 1 wherein the providing addresses for at least four bilerps for at least two pixels in the plurality of pixels comprises:
   providing a first plurality of addresses for a first bilerp for the at least two pixels in the plurality of pixels; and
   providing a second plurality of addresses for a second bilerp for the at least two pixels in the plurality of pixels.

6. The method of claim 5 further comprising, before providing the first plurality of addresses and the second plurality of addresses:
   determining whether a bank conflict exits between the first and second addresses.

7. The method of claim 1 further comprising:
   if bilinear filtering is to be performed on the plurality of texels, then
   providing addresses for one bilerp for each pixel in the plurality of pixels;
   receiving the bilerp for each pixel in the plurality of pixels; and
   filtering the bilerp for each pixel in the plurality of pixels.

8. A method of filtering texels comprising: with a texture pipeline:
   receiving a plurality of pixels;
   generating a request for a plurality of texels;
   determining a type of filtering to be performed on the plurality of texels;
   if trilinear filtering is to be performed on the plurality of texels, then
   providing addresses for a first bilerp for each pixel in the plurality of pixels, the first bilerps in a first level of detail;

providing addresses for a second bilerp for each pixel in the plurality of pixels, the second bilerps in a second level of detail;

receiving the first bilerp for each pixel in the plurality of pixels, the first bilerps in a first level of detail;

receiving the second bilerp for each pixel in the plurality of pixels, the second bilerps in a second level of detail; and filtering the first and second bilerps for each pixel in the plurality of pixels, wherein the first and second bilerps for each pixel in the plurality of pixels are received in one clock cycle.

9. The method of claim 8 wherein the plurality of pixels comprises four pixels.

10. The method of claim 9 further comprising:

if bilinear filtering is to be performed on the plurality of texels, then providing addresses for one bilerp for each pixel in the plurality of pixels;

receiving the bilerp for each pixel in the plurality of pixels; and filtering the bilerp for each pixel in the plurality of pixels.

11. The method of claim 9 further comprising:

if 2:1 aniso filtering is to be performed on the plurality of texels, then providing addresses for at least two bilerps for each pixel in the plurality of pixels;

receiving at least two bilerps for each pixel in the plurality of pixels; and filtering the at least two bilerps for each pixel in the plurality of pixels, wherein the at least two bilerps for each pixel in the plurality of pixels are received in one clock cycle.

12. The method of claim 8 wherein the addresses are provided to a texture cache, and texels are received from the texture cache.

13. The method of claim 8 wherein the providing addresses for a first bilerp and a second bilerp for each pixel in the plurality of pixels comprises:

providing a first plurality of addresses for a first bilerp for each pixel in the plurality of pixels; and providing a second plurality of addresses for a second bilerp for each pixel in the plurality of pixels.

14. The method of claim 13 further comprising, before providing the first plurality of addresses and the second plurality of addresses:

determining whether a bank conflict exits between the first and second addresses.

15. An integrated circuit comprising:

a texture cache comprising a plurality of banks, the texture cache configured to store a plurality of texels;

a first address circuit coupled to the texture cache and configured to provide a first plurality of addresses to the texture cache;

a second address circuit coupled to the texture cache and configured to provide a second plurality of addresses to the texture cache;

a first texture filter coupled to the texture cache and configured to receive a first plurality of texels from the texture cache; and a second texture filter coupled to the texture cache and configured to receive a second plurality of texels from the texture cache, wherein for trilinear filtering, the texture cache is further configured to provide at least a first bilerp from a first level of detail for each pixel in the plurality of pixels to the first texture filter, and to provide at least a second bilerp from a second level of detail for each pixel in the plurality of pixels to the second texture filter in one clock cycle.

16. The integrated circuit of claim 15 wherein the plurality of pixels comprises four pixels.

17. The integrated circuit of claim 15 wherein each bank in the texture cache comprises one read port and one write port.

18. The integrated circuit of claim 15 further comprising:

a scheduler coupled to the first address circuit and the second address circuit, wherein the scheduler is configured to determine the type of filtering needed for the first and second plurality of texels.

19. The integrated circuit of claim 15 wherein for bilinear filtering, the texture cache is further configured to provide at least a first bilerp for each pixel in the plurality of pixels to the first texture filter in one clock cycle.

20. The integrated circuit of claim 15 wherein the integrated circuit is a graphics processor.

* * * * *